UNITED STATES PATENT OFFICE.

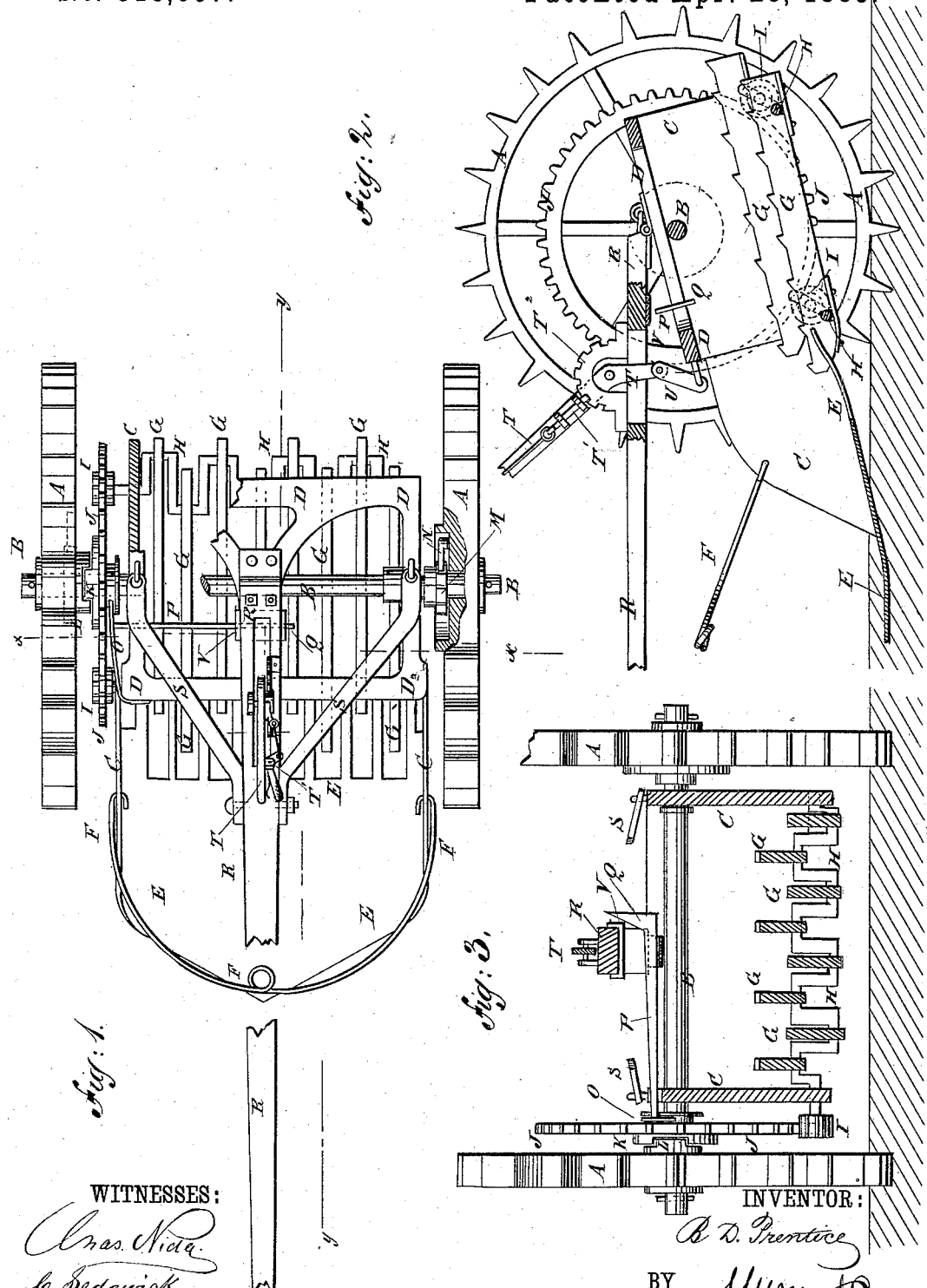

BURTON D. PRENTICE, OF CASTALIA, OHIO.

POTATO-DIGGER.

SPECIFICATION forming part of Letters Patent No. 316,657, dated April 28, 1885.

Application filed May 13, 1884. (No model.)

*To all whom it may concern:*

Be it known that I, BURTON D. PRENTICE, of Castalia, in the county of Erie and State of Ohio, have invented a new and useful Improvement in Potato-Diggers, of which the following is a full, clear, and exact description.

Reference is to be had to the accompanying drawings, forming a part of this specification, in which similar letters of reference indicate corresponding parts in all the figures.

Figure 1 is a plan view of my improvement, part being broken away. Fig. 2 is a sectional side elevation of the same, taken through the line $y\ y$, Fig. 1. Fig. 3 is a sectional front elevation of the same, taken through the broken line $x\ x$, Fig. 1.

The object of this invention is to facilitate the digging of potatoes, and the separating of the said potatoes from the soil.

The invention consists in the construction and arrangement of parts, as will be hereinafter fully described and claimed.

A represents the drive-wheels, the axle B of which passes through the upper parts of the side plates, C. The upper edges of the side plates, C, are connected by a frame, D.

To the lower edges of the forward parts of the plates C is attached the scoop E, by which the potatoes and the soil in which they are embedded are separated from the ground. To the upper parts of the forward ends of the side plates, C, are hinged the ends of the bail F, to an eye in the center of which the draft is applied. The rear edge of the scoop E is slotted to receive the forward ends of the bars G, which are placed parallel with each other, and have teeth formed upon their upper edges. Every other bar G is pivoted near its ends to cranks formed upon one side of the crank-shafts H, and the other bars G are pivoted to cranks formed upon the other sides of the said crank-shafts, so that half the bars G will be up when the other half is down, as shown in Fig. 3, and the two sets will move up and down successively. The crank-shafts H revolve in bearings in the lower parts of the side plates, C. The journals of the crank-shafts H at one end project, and to them are attached small gear-wheels I, the teeth of which mesh into the teeth of the front and rear lower parts of the large gear-wheel J, placed loose upon the axle B.

Upon the outer end of the hub of the gear-wheel J are formed clutch-teeth K to engage with clutch-teeth L formed upon or attached to the axle B.

Upon the axle B, or upon sleeves or collars rigidly attached to the said axle, are formed ratchet-teeth M, with which engage pawls N, pivoted to the hubs of the wheels A, so that the forward movement of the wheels A, or of either of the said wheels, will revolve the axle B and drive the gear-wheels J. The faces of the wheels A are provided with teeth or corrugations to take hold of the ground and prevent the said wheels from slipping.

Upon the inner end of the hub of the gear-wheel J is formed an annular groove in which rests the forked rear end of the spring O, the forward end of which is rigidly attached to the frame D or side plate, C, and which is so formed as when left free to hold the gear-wheels J in gear with the clutch-teeth L.

To the spring O is rigidly attached the outer end of the bar P, which passes through a slot in the frame D or side plate, C, and rests upon the center bar of the said frame.

Upon the inner end of the bar P is formed an arm, Q, which projects upward at the farther side of the tongue R, and is inclined upon its inner side, as shown in Fig. 3. The inclined side of the arm Q rests against the farther side of the tongue R, so that when the forward end of the machine is forced upward the said bar P and the spring O will be drawn inward, forcing the gear-wheel J out of gear with the clutch-teeth L and stopping the revolution of the said gear-wheel.

To the central bar of the frame D, a little in the rear of its center, is hinged the rear end of the tongue R, by means of which the machine is guided, and which is strengthened against side strain by braces or hounds S, the forward ends of which are attached to the opposite sides of the said tongue R, and their rear ends are hinged to the side bar of the frame D.

To supports attached to the tongue R is pivoted at its angle the lever T, which projects downward through a slot in the said tongue, and is connected by a link, U, with the front cross-bar of the frame D, so that the front of the frame D, and with it the forward ends of the side plates, C, and the scoop E, can be raised and lowered by operating the said lever T.

The lever T is provided with a spring-pawl, T', to engage with a toothed catch-plate, T², attached to the tongue R, so that the said lever T, and with it the scoop E, will be held securely in any position into which they may be adjusted. With this construction, when the lever T is operated to raise the scoop E from the ground, the bar P bears against the lower left-hand corner of the tongue R and is forced inward, throwing the gear-wheel J out of gear with the axle B. As the scoop E is lowered into working position the bar P is withdrawn from the tongue R, allowing the spring O to throw the gear-wheel J again into gear with the axle B.

To the lower left-hand corner of the tongue R is attached a small friction plate or wheel, V, to prevent the under side of the tongue from being worn by the friction of the bar P. With this construction, when the machine is drawn forward with the scoop E in working position, the potatoes and soil raised by the said scoop will pass back upon the bars G, by the movements of which the soil will be shaken from the potatoes and will fall through the spaces between the said bars to the ground, and the potatoes will be carried back by the bars G, and will fall from the rear of the said bars to the ground, ready to be gathered.

When the machine is drawn forward with the scoop E raised out of the ground, the gear will be out of gear with the axle and the bars G will not be vibrated.

Having thus described my invention, I claim as new and desire to secure by Letters Patent—

1. In a potato-digger, the combination of the drive-wheels, axle B, and gear-wheel J, with the side plates, C, hung loosely on the axle B, frame D, connecting the upper edges of the side plates, slotted scoop E, the two crank-shafts H H, journaled in the lower edges of side plates, C, pinions I on said shafts meshing with wheel J, plates G, secured alternately to the opposite cranks of said shaft, tongue R, hinged at its rear end to the frame D, angle-lever T, and link U, connecting the frame D and tongue R, and lever P, mounted to slide in frame D in a plane at right angles with the tongue, and provided with a beveled extension, Q, extending upward to one side of the tongue and connected at its outer end with a clutch mechanism connecting the drive-shaft and gear J, whereby, when the forward end of the tongue is raised or the scoop elevated, the inclined extension Q will cause the lever P to operate the clutch mechanism to disengage the gear-wheel J from the drive-wheel, substantially as set forth.

2. The combination, with the drive-wheel A, provided with clutch-teeth L, of the axle B, gear-wheel J, mounted loosely thereon and provided with clutch-teeth K, frame D, side plates, C, plates G, crank-shaft H, pinion I on the same meshing with the gear-wheel J, tongue R, pivoted to frame D, spring O, secured at one end to frame D and engaging the gear-wheel J with its free end, bar P, secured rigidly at one end to the spring O, and projecting at right angles thereto, beveled extension Q, projecting upon the side of the tongue opposite to wheel J, and an adjusting mechanism connecting the frame D and the tongue.

BURTON D. PRENTICE.

Witnesses:
H. S. PEEKE,
L. H. GOODWIN.